United States Patent
Rostvall et al.

(10) Patent No.: US 10,692,610 B2
(45) Date of Patent: Jun. 23, 2020

(54) METHOD OF CONTROLLING PRESSURE IN A FUEL ROD

(71) Applicant: Westinghouse Electric Sweden AB, Västerås (SE)

(72) Inventors: Thomas Rostvall, Stockholm (SE); Pontus Löf Helmersson, Kolbäck (SE)

(73) Assignee: Westinghouse Electric Sweden AB, Västerås (CH)

( * ) Notice: Subject to any disclaimer, the term of this patent is extended or adjusted under 35 U.S.C. 154(b) by 178 days.

(21) Appl. No.: 15/559,936

(22) PCT Filed: Mar. 23, 2016

(86) PCT No.: PCT/EP2016/056350
§ 371 (c)(1),
(2) Date: Sep. 20, 2017

(87) PCT Pub. No.: WO2016/151003
PCT Pub. Date: Sep. 29, 2016

(65) Prior Publication Data
US 2018/0082758 A1 Mar. 22, 2018

(30) Foreign Application Priority Data
Mar. 24, 2015 (EP) .................................... 15160503

(51) Int. Cl.
*G21C 3/10* (2006.01)
*G01L 11/02* (2006.01)
(Continued)

(52) U.S. Cl.
CPC ................ *G21C 3/10* (2013.01); *G01L 11/02* (2013.01); *G21C 17/06* (2013.01); *G21C 21/02* (2013.01);
(Continued)

(58) Field of Classification Search
CPC . G21F 7/047; G01L 11/02; G01L 7/00; G21C 17/06; G21C 21/02
See application file for complete search history.

(56) References Cited

U.S. PATENT DOCUMENTS 4,167,959 A * 9/1979 Weichselgartner ..... G21F 7/047
141/392
4,181,008 A 1/1980 John, Jr.
(Continued)

FOREIGN PATENT DOCUMENTS

JP        H102991 A    1/1998
JP        2001033583    7/1999

OTHER PUBLICATIONS

NPTEL. Strength of Materials. Lecture 16. Dec. 2013. <https://nptel.ac.in/courses/Webcourse-contents/IIT-ROORKEE/strength%20of%20materials/lects%20&%20picts/image/lect16/lecture16.htm>. (Year: 2013).*

(Continued)

*Primary Examiner* — Lily C Garner
(74) *Attorney, Agent, or Firm* — Murtha Cullina LLP

(57) ABSTRACT

A method and a system includes controlling and monitoring the gas pressure in a nuclear fuel rod during filling of the fuel rod with a gas, and subsequent sealing of the fuel rod. The system includes a control unit and a length measuring system, which control unit is communicatively connected to the length measuring system. The length measuring system is configured to monitor the length of the fuel rod, and the control unit is configured to receive measurements from the length measuring system and to determine the gas pressure inside the fuel rod on the basis of variations of the length of the fuel rod. The method includes positioning an open first end of the fuel rod inside a pressure chamber, allowing gas to enter the fuel rod; pressurizing the gas in the pressure chamber at a first pressure level; closing the fuel rod; and sealing the fuel rod.

9 Claims, 3 Drawing Sheets

(51) Int. Cl.
    *G21C 17/06*         (2006.01)
    *G21C 21/02*         (2006.01)
    *G21F 7/047*         (2006.01)
    *G01L 7/00*          (2006.01)

(52) U.S. Cl.
    CPC ................ *G01L 7/00* (2013.01); *G21F 7/047* (2013.01); *Y02E 30/40* (2013.01)

(56) References Cited

U.S. PATENT DOCUMENTS

| | | | | |
|---|---|---|---|---|
| 4,925,619 | A * | 5/1990 | Sparrow | ................ G21C 17/06 33/DIG. 13 |
| H001262 | H * | 12/1993 | Bacvinskas | ............ G21C 17/06 376/252 |
| 5,319,178 | A | 6/1994 | Sando et al. | |
| 6,563,970 | B1 * | 5/2003 | Bohnert | ................ G01L 9/0007 385/13 |

OTHER PUBLICATIONS

MIT: Pressure Vessels. David Roylance. Aug. 2001. <http://web.mit.edu/course/3/3.11/www/modules/pv.pdf>. (Year: 2001).*
Physics Stack Exchange. Diameter of after elongation of a cylinder, URL version: Mar. 8, 2015: <https://physics.stackexchange.com/q/169052>. (Year: 2015).*
International Preliminary Report on Patentability for corresponding PCT/EP2016/056350 dated Sep. 26, 2017.
International Search Report issued in corresponding application No. PCT/EP2016/056350, dated Jun. 17, 2016, pp. 1-2.

\* cited by examiner

METHOD OF CONTROLLING PRESSURE IN A FUEL ROD

TECHNICAL FIELD

The invention relates to controlling the gas pressure in a nuclear fuel rod, especially during sealing of the fuel rod, e.g. by welding.

BACKGROUND

Typical fuel rods for nuclear reactors comprise a cladding tube, and fuel pellets are inserted into the cladding tube together with a spring for holding the fuel pellets in position. Each fuel rod is pressurized with a gas, typically helium, and the fuel rod is subsequently plugged. The fuel rod is plugged by means of a plug that is pressed into the cladding tube. The plug is sealed, normally by means of welding, to the cladding tube, in order to ensure that the pressure inside the fuel rod is maintained. However, such welding may be performed at a lower surrounding pressure than the pressure inside the fuel rod. A plugged fuel rod may leak gas before the plug has been sealed, and thereby loose some pressure. A fuel rod with too low pressure may not function properly and may also cause damage when operating in the nuclear process. It is therefore important to ensure that the pressure inside the fuel rod is maintained at a proper level after the sealing of the fuel rod.

U.S. Pat. No. 5,319,178 ("Sando") illustrates a welding apparatus for welding plugs to fuel rods, which apparatus holds the fuel rod and applies a pressure to the fuel rod during welding. FIG. 7 in document "Sando" illustrates a fuel rod P being held by a holding mechanism F3, and a plug C is welded to the top of the fuel rod P inside welding chamber 18. A pressing mechanism F1 is used to apply pressure to the connection between the fuel rod P and the plug C during the welding. FIG. 6, in document "Sando", illustrates in more detail a welding torch 16 inside the welding chamber 18, which welding torch 16 is used when welding the plug C to the fuel rod P. The fuel rod is rotatably arranged to the welding chamber 18 and is rotated during the welding.

U.S. Pat. Nos. 4,925,619 and 4,181,008 show two systems for monitoring the internal gas pressure of a fuel rod.

U.S. Pat. No. 4,925,619 discloses an apparatus for sensing the internal pressure of a fuel rod. The apparatus comprises a strain gauge that senses the increase in diameter of the fuel rod that is caused by the pressurization of the fuel rod.

U.S. Pat. No. 4,181,008 describes a method for assuring the pressure of a fuel rod during manufacturing of the fuel rod. This method utilizes a system of external chambers for determining whether gas leaks from the fuel rod after welding, wherein pressure sensors measure the pressure in the external chambers.

SUMMARY

An object of the invention is to provide an alternative to the methods and apparatuses of the prior art.

An object of the invention is to provide a comparatively reliable and less complex method than in the prior art.

According to a first aspect, the invention provides a method of controlling the pressure of a gas inside a fuel rod. The method includes:
positioning a first end of the fuel rod inside a pressure chamber, which first end is open and allows gas to enter the fuel rod;
pressurizing a gas in the pressure chamber at a first pressure so that the fuel rod is filled with gas and pressurized at the first pressure level;
closing the first end of the fuel rod; and
sealing the fuel rod.
The method also includes:
monitoring the variation of the length of the fuel rod, which monitoring is performed between the step of closing and the step of sealing the fuel rod, and using the length variation as a measure of the variation of the gas pressure inside the fuel rod.

Monitoring the length is simple to perform. Monitoring the length is also a reliable way to estimate the strain created by the internal pressure of the fuel rod, especially in fuel rods where the length is much larger than the circumference.

In an embodiment, the method includes, after the step of closing the fuel rod:
releasing the pressure in the pressure chamber outside the fuel rod to a second pressure level,
maintaining the second pressure level in the pressure chamber outside the fuel rod during a first time period T while monitoring the variation of the length of the fuel rod; and, in this embodiment, the step of sealing is performed during a second time period, which second time period is shorter than, or equal to, the first time period T.

In an embodiment the monitoring includes establishing a length variation ΔL of the fuel rod during the first time period T, and the measure of the gas pressure is determined from the established length variation ΔL.

Especially, said measure, e.g. decrease, of the gas pressure can be estimated since the length variation ΔL can be used as a measure of the gas pressure variation.

In an embodiment, the closing of the fuel rod comprises inserting a plug in the first end of the fuel rod, and the sealing of the fuel rod comprises welding the plug to the fuel rod. Welding a plug to the fuel rod is a suitable way to ensure a reliable sealing of the fuel rod.

In an embodiment, the sealing of the fuel rod is performed at the second pressure level. In this way a suitable pressure level for sealing, e.g. welding, the fuel rod can be selected.

In an embodiment, the step of positioning the fuel rod includes securing the fuel rod from moving in its longitudinal direction, said securing preferably allowing rotation of the fuel rod. Securing the fuel rod from moving in the longitudinal direction simplifies the monitoring of the length variation.

In an embodiment, the monitoring of the length includes monitoring of the second end of the fuel rod.

In an embodiment, the monitoring includes a visual monitoring, especially a visual monitoring of the second end of the fuel rod.

An advantage with visual inspection is that it does not affect the fuel rod.

According to a second aspect of the invention, a system for monitoring the gas pressure inside a fuel rod is provided. The system is configured for monitoring the gas pressure in a fuel rod during filling of the fuel rod with a gas, and subsequent sealing of the fuel rod. The system comprises a control unit and a length measuring system, which control unit is communicatively connected to the length measuring system. The length measuring system is configured to monitor the length of the fuel rod, and the control unit is configured to receive measurements from the length measuring system and to determine the gas pressure inside the fuel rod on the basis of variations of the length of the fuel rod.

In an embodiment, the system is configured to monitor the length of the fuel rod after pressurization of the fuel rod when the pressure of the gas inside the fuel rod reaches a first pressure level, and monitor the length of the fuel rod after lowering the surrounding pressure to a second pressure level at which second pressure level the fuel rod is sealed.

In an embodiment, the system is configured to monitor the length of a fuel rod during closing of the fuel rod at the first pressure level, and determine a variation ΔL of the fuel rod length at the second pressure level during a first time period T, and using the length variation ΔL to determine the gas pressure variation in the fuel rod.

In an embodiment, the system is adapted for a process of sealing the fuel rod that is initiated at the end of the first time period T, and which sealing is performed at the second pressure level within a second time period, which second time period is shorter than, or equal to, the first time period T.

In an embodiment, the length measuring system is an optical system.

BRIEF DESCRIPTION OF THE DRAWINGS

The invention will be described in more detail with reference to the accompanying drawings wherein.

DETAILED DESCRIPTION

The invention will be described with reference to the exemplifying embodiments illustrated in the figures. The invention is however not restricted to these illustrated embodiments, but may be varied within the scope of the claims.

Figure 1:
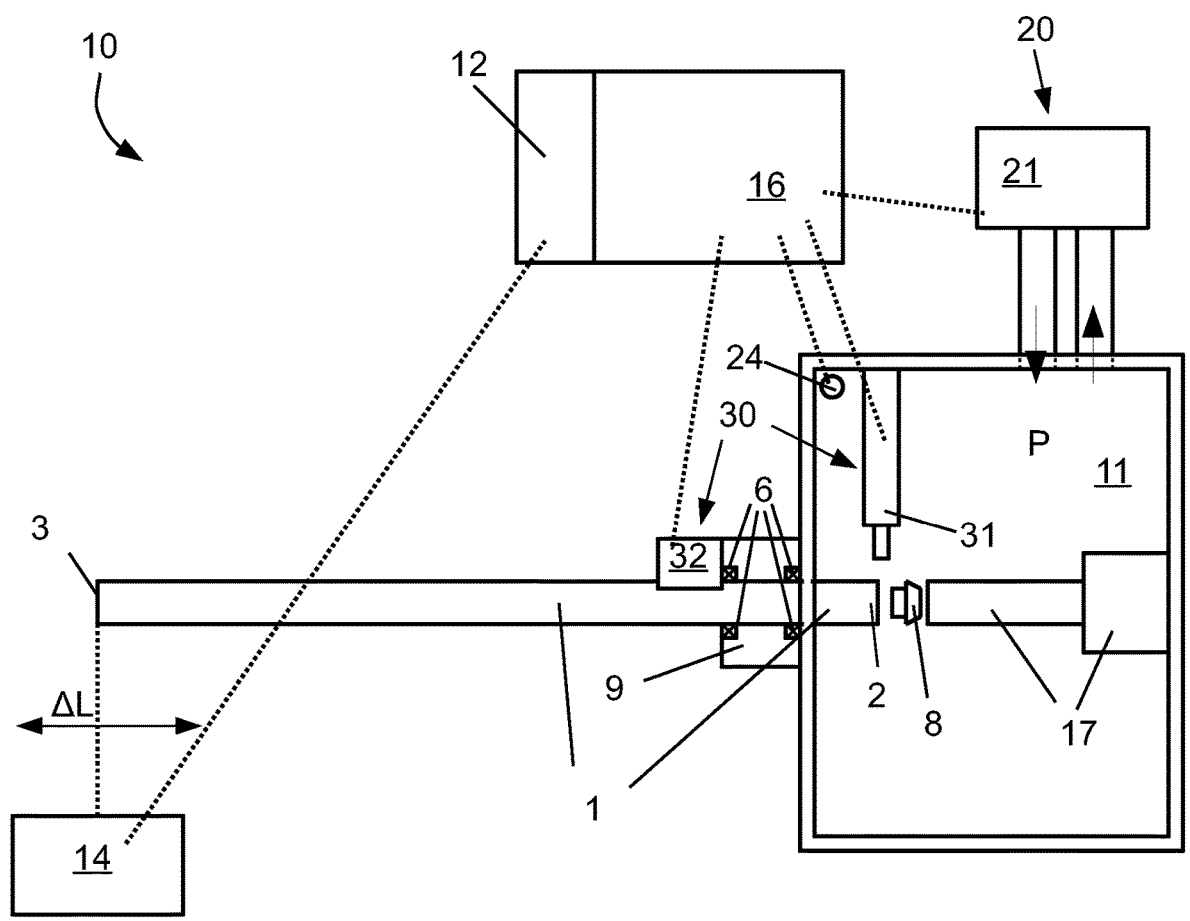
FIG. 1 illustrates an embodiment of a system according to the invention.

FIG. 1 illustrates a system 10 for monitoring the pressure in a tubular fuel rod 1 during pressurization of the fuel rod 1 with helium gas and during sealing of the fuel rod 1 by means of welding. During pressurization and sealing, the fuel rod 1 is secured at a pressure or welding chamber 11 with a first end 2, which is open, inside the pressure or welding chamber 11 and a second, closed, end 3 outside the welding chamber 11. The fuel rod 1 comprises a substantially cylindrical tube that extends in its longitudinal direction between the first end 2 and the second end 3. The fuel rod 1 is preferably rotatably arranged in relation to the welding chamber 11 to allow rotation around a longitudinal axis of the fuel rod 1 during welding, which longitudinal axis extends in the longitudinal direction. At the first end 2, the fuel rod 1 is secured to the welding chamber 11 so that it is prevented from moving in its longitudinal direction. A clamp 9 is configured to secure the fuel rod 1, close to the first end 2, from movements in the longitudinal direction of the fuel rod 1, and includes bearings 6 to allow rotation of the fuel rod 1 around its longitudinal axis. The clamp 9 is configured to provide a sealing between the fuel rod 1 and the welding chamber 11. A substantial part between the clamp 9 and the second end 3 is arranged freely movable in the longitudinal direction so that the fuel rod is elongated upon being filled with pressurized gas.

The monitoring system 10 comprises a control unit 12, and a length measuring system 14. The control unit 12 is incorporated in a controller 16 that is configured for pressurizing the fuel rod 1 with helium by means of a helium system 20 and is configured for sealing a plug 8 in the fuel rod 1 by means of a welding system 30. The helium system 20 comprises a helium source, container 21, and means for controlling the pressure of the helium gas, such as at least one pump and at least one valve (not illustrated). The helium system 20 is also adapted for evacuating and vacuumizing the welding chamber 11. The controller 16 is connected to a pressure sensor 24 arranged in connection to the welding chamber 11 and configured to sense the pressure inside the welding chamber 11. The welding system 30 comprises a welding unit 31 arranged inside the welding chamber 11 and means 32 for rotating the fuel rod 1. The means 32 for rotating the fuel rod 1 may form a part of the clamp 9, wherein the clamp 9 with bearings 6 and the rotating means 32 are integrated in one component.

The control unit 12 is configured to receive measurements of the fuel rod 1 length, or variations of the fuel rod length, from the length measuring system 14. The length measuring system 14 is preferably an optical monitoring system and is arranged at the second end 3 of the fuel rod 1 outside the welding chamber 11. The length measuring system 14 is configured to register the length, or the variations of the length, of the fuel rod 1 during pressurization with helium gas at a first pressure level and at a lower second pressure level, i.e. welding pressure level, before performing the welding of the plug 8 to the fuel rod 1. The length variations registered by the length monitoring system 14 is received by the control unit 12, which control unit 12 is configured to estimate the gas pressure inside the fuel rod 1 based on the length measurements.

A plug applier 17 is arranged inside the welding chamber 10 and is configured for inserting the plug 8 in the open end, i.e. the first end 2, of the fuel rod 1.

An optical measuring system is the preferred length monitoring system, since it provides a contact free measurement in contrast to using for example a strain sensor. Further it also provides a "floating" axial reference point, which can be automatically set for each individual fuel rod 1. The optical system should be provided with a resolution of at least about 2 μm, i.e. the "size" of one pixel, for conventional types of fuel rods. The system in use consists preferably of a high resolution (5MP) color camera with a telecentric lens. The control unit 12 may be configured with a standard image processing program used for optical measuring systems, where the digital data from the camera can be processed and evaluated. The length variation is evaluated in the control unit 12, or alternatively in the controller 16. The elongation of the fuel rod will be in the range of a few microns per bar for conventional fuel rods. In general, a camera should be chosen that has a resolution sufficient enough to detect an unwanted deviation from the nominal pressure of the fuel rod 1 in question.

Figure 2:
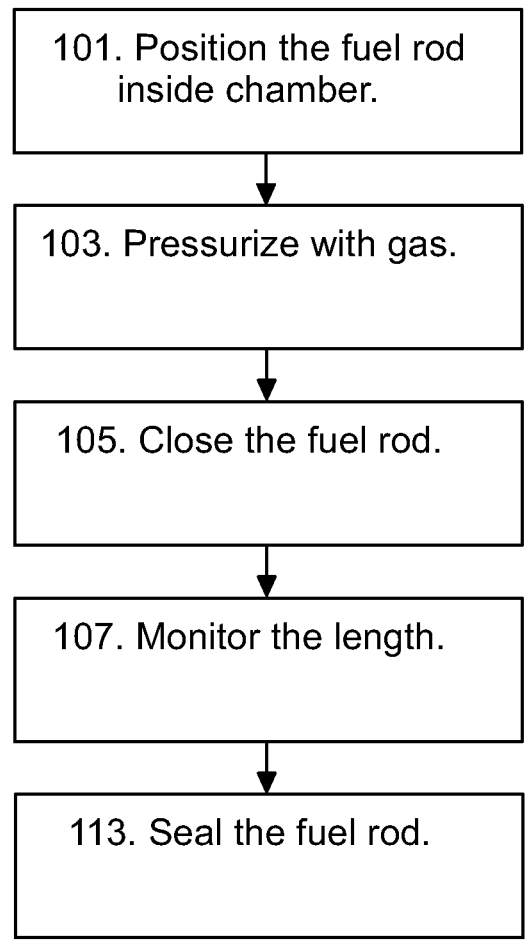
FIG. 2 illustrates an embodiment of a method according to the invention.

FIG. 2 illustrates an embodiment of a method of pressurizing and sealing a fuel rod 1 in accordance with the invention. The fuel rod 1 is filled with fuel pellets and a spring, or a spring clip, for holding the fuel pellets before the fuel rod 1 is pressurized. The method of pressurizing starts by positioning and securing 101 of the fuel rod 1 with the first end 2, which is open, inside the welding chamber 11.

The welding chamber 11 is pressurized 103 with gas, preferably helium gas, and thereby the fuel rod 1 is filled and pressurized with the gas.

The next step is closing 105 the fuel rod 1 by inserting the plug 8 into the first end 2 of the fuel rod 1.

The subsequent step is monitoring 107 the length of the fuel rod 1. The length provides a measure of the gas pressure inside the fuel rod 1. The length is monitored at the second end 3, which is freely movable in the longitudinal direction, so that a decrease of the pressure, such as from a gas leak, can be detected. Moreover, if the length does not decrease, the pressure is assured. The length decrease can be utilized to establish that the pressure inside the fuel rod 1 maintains at an appropriate level since the length variation corresponds to the variation, such as decrease, of the gas pressure within the fuel rod 1.

The next step is sealing 113 of the fuel rod, which sealing is preferably performed by means of welding.

Figure 3:
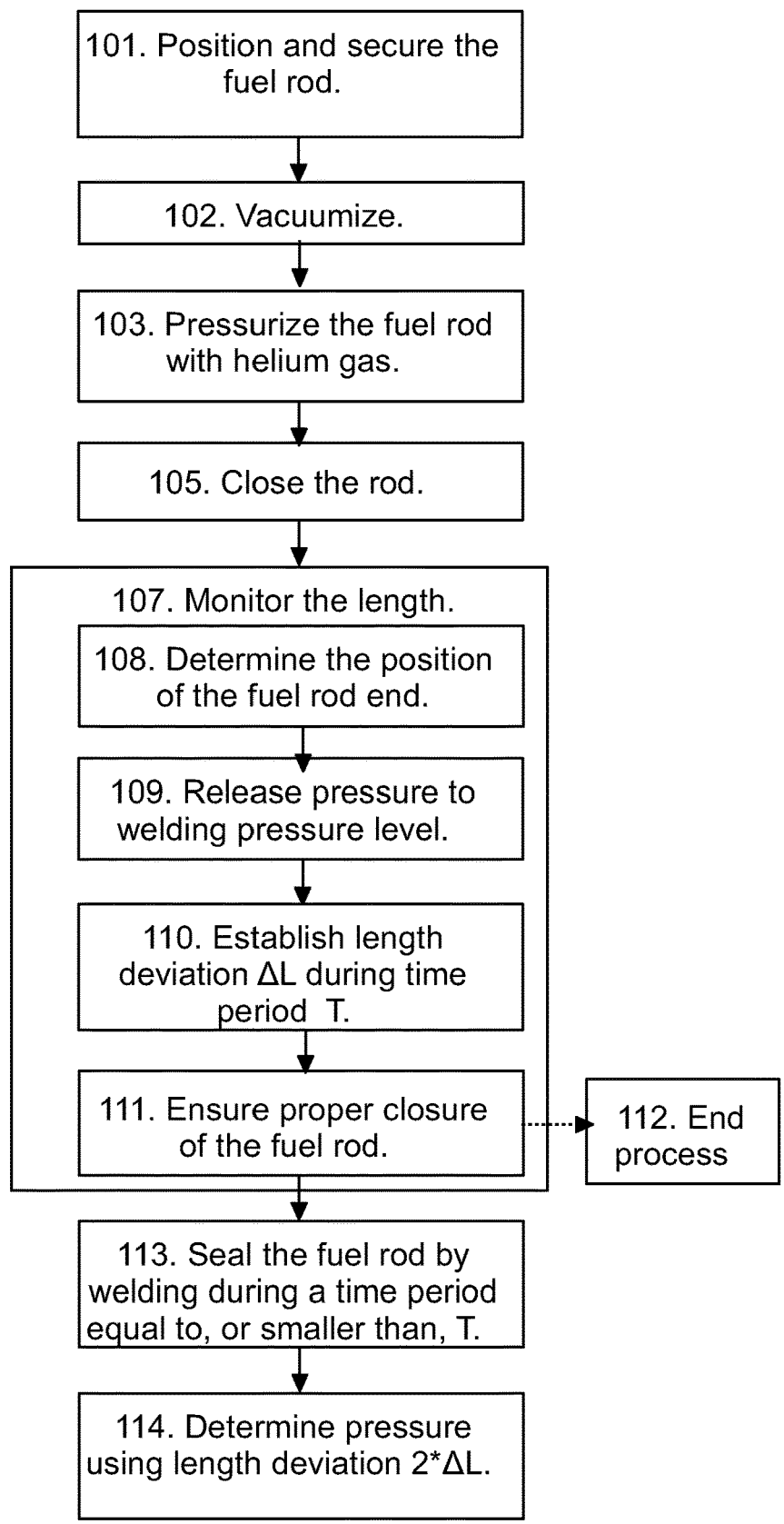
FIG. 3 illustrates a detailed embodiment of a method according to the invention.

FIG. 3 illustrates further embodiments of the method of the present invention. The method is initiated by positioning 101 the fuel rod 1 with its first, open, end 2 inside the welding chamber 11. The second end 3 of the fuel rod 1, which is closed, is positioned outside the welding chamber 11. In this step, the first end 2 of the fuel rod 1 is secured in its longitudinal direction by means of the clamp 9 so that it is fixed, and may not move, in the longitudinal direction. It is preferred that the clamp 9 comprises at least one bearing 6 that allows rotation of the fuel rod 1 around the longitudinal axis so that the fuel rod is 1 rotatably arranged in the welding chamber 11. It is preferred that the clamp 9 comprises means 32 for rotating the fuel rod 1 in order to effectuate rotation of the fuel rod 1 during sealing. The sealing is preferably performed by welding. Alternatively, the fuel rod 1 is secured also from being rotated, and may be sealed by welding by means of a movable welding unit. The positioning 101 may also include setting a reference for the length at the second end 3 of the fuel rod 1 by means of the length measuring system 14.

After positioning 101, the method continues with vacuumizing 102 the welding chamber 11.

After positioning 101 the fuel rod 1 and vacuumizing 102 the welding chamber 11, the method includes pressurizing 103 the fuel rod 1 with a gas, such as helium by means of the helium system 20, including filling the welding chamber 11 and thereby the fuel rod 1 with the gas at a first pressure level.

The elongation of a fuel rod 1 during pressurization can be measured and used to determine the relation between the length variation and the pressure variation.

When the fuel rod 1 has been pressurized, the method continues with closing 105 the fuel rod by inserting the plug 8 into the first end 2 of the fuel rod 1.

After the first end 2 of the fuel rod 1 has been closed under pressure at the first pressure level, the method continues with initiating the monitoring 107 of the length of the fuel rod 1 which monitoring 107 is performed at the second end 3. The monitoring 107 preferably includes establishing a reference of the length. A reference for the length measurements may alternatively be set after pressurization 103, and before closing 105 of the fuel rod 1. Thus, the monitoring 107 may start with establishing 108 the position of the second end 3 of the fuel rod 1 outside the welding chamber 11. The monitoring 107 may be used for determining the length of the fuel rod 1, which length corresponds to the first pressure level, i.e. the strain of the fuel rod 1 corresponds to the first pressure level above the surrounding, or atmospheric, pressure. Monitoring 107 a decrease in length will then correspond to a decrease of the internal gas pressure of the fuel rod 1.

The monitoring 107 may include establishing the length of the fuel rod 1 after sealing 113 of the fuel rod 1, and the decrease in length can be used for determining the pressure inside the fuel rod 1 and ensure that the pressure has not decreased more than a tolerance level, i.e. ensure that the pressure level inside the fuel rod 1 is high enough for the fuel rod 1 to be used in a nuclear process.

After initiating the monitoring 107 of the length of the fuel rod 1, the method preferably includes a step of releasing 109 the pressure in the welding chamber 11, wherein the pressure is lowered to a second pressure level, i.e. the sealing pressure.

A preferred way to ensure that the pressure inside the fuel rod 1 after sealing is appropriate is to monitor the decrease in length during a time period T that corresponds to the time period required for sealing, e.g. welding, the plug 8 to the fuel rod 1. After closing 105 the fuel rod the method preferably continues with establishing 110 the length variation, normally decrease, ΔL during the time period T that starts from the time of releasing 109 the pressure. The method preferably continues with ensuring 111 that the fuel rod 1 has been properly closed, i.e. that the pressure has dropped less than a predetermined maximum level threshold, which step of ensuring 111 is based on the length decrease during the time period T.

If the length of the fuel rod 1 has decreased more than the threshold, the process may be ended.

If the decrease in length is less than required, the method continues with sealing 113 the fuel rod, which sealing is performed during a time period equal to, or less than, the time period T. Thus, preferably, the monitoring 107 of the length at the second pressure, i.e. after lowering 109 the pressure, is performed during a first time period T, and the sealing 113 is performed during a second time period that immediately follows the first time period T, and which second time period is equal to the first time period T.

The method preferably continues after sealing 113 with determining 114 the pressure inside the fuel rod using the established length decrease ΔL, e.g. using twice the established length decrease 2*ΔL as a measure of total length decrease, which total length decrease 2*ΔL corresponds to a total pressure decrease for the total time period 2*T, the time period T of monitoring and the time period of welding, which time period of welding is equal to, or less than, the time period T of monitoring.

Thus, the method includes estimating the gas pressure in the fuel rod after the sealing, e.g. welding, of the fuel rod 1, which estimation is based on the length measurements performed prior to the sealing, or welding. When the sealing process involves rotating the fuel rod 1, it is especially advantageous to establish the length measurements prior to the sealing, i.e. prior to rotation, since rotation of the fuel rod 1 may affect the length measurements by moving the fuel rod 1 slightly in the longitudinal direction.

What is claimed is:

1. A method of controlling the pressure of a gas inside a fuel rod, said method comprising:
   positioning a first end of the fuel rod inside a pressure chamber, wherein said first end of the fuel rod is an open end and allows gas to enter the fuel rod;
   pressurizing a gas in the pressure chamber at a first pressure level so that the fuel rod is filled with gas and pressurized at the first pressure level;
   closing the first end of the fuel rod;
   sealing the fuel rod; and
   monitoring the variation of a length of the fuel rod, wherein said monitoring is performed between the step of closing and the step of sealing the fuel rod, and using the length variation as a measure of the gas pressure variation inside the fuel rod,
   wherein after the step of closing the fuel rod, said method comprises:

releasing the pressure in the pressure chamber to a second pressure level; and maintaining the second pressure in the pressure chamber during a first time period T while performing said monitoring of the variation of the length of the fuel rod; and wherein the step of sealing is performed during a second time period, wherein the second time period is shorter than, or equal to, the first time period T.

2. The method of controlling the pressure according to claim 1, wherein a length variation ΔL of the fuel rod during the first time period T is established, and the measure of the gas pressure is determined from the established length variation ΔL.

3. The method of controlling the pressure according to claim 1, wherein the sealing of the fuel rod is performed at the second pressure level.

4. The method of controlling the pressure according to claim 1, wherein the closing of the fuel rod comprises inserting a plug in the first end of the fuel rod, and wherein the sealing of the fuel rod comprises welding the plug to the fuel rod.

5. The method of controlling the pressure according to claim 1, wherein the step of positioning the fuel rod includes securing the fuel rod from moving in its longitudinal direction.

6. The method of claim 5 wherein said securing is configured to allow rotation of the fuel rod in relation to the pressure chamber.

7. The method of claim 5 wherein said securing is configured to provide sealing to the pressure chamber.

8. The method of controlling the pressure according to claim 1, wherein the length of the fuel rod increases or decreases by moving the second end of the fuel rod in its longitudinal direction.

9. The method of controlling the pressure according to claim 1, wherein the monitoring of the length includes a visual monitoring of the fuel rod.

\* \* \* \* \*